(12) United States Patent
Solarski et al.

(10) Patent No.: US 11,765,417 B2
(45) Date of Patent: Sep. 19, 2023

(54) SYSTEMS AND METHODS TO REDUCE ACKNOWLEDGMENT REQUESTS IN BROADCAST TRANSMISSION NETWORKS

(71) Applicant: GOOGLE LLC, Mountain View, CA (US)

(72) Inventors: Charles Alexander Solarski, Sunnyvale, CA (US); David Andrew Brown, Sunnyvale, CA (US); Stella Loh, Los Altos, CA (US); Akshay Lal, Fremont, CA (US); Tyrone Hidekazu Nakahara, San Carlos, CA (US)

(73) Assignee: GOOGLE LLC, Mountain View, CA (US)

( * ) Notice: Subject to any disclaimer, the term of this patent is extended or adjusted under 35 U.S.C. 154(b) by 173 days.

(21) Appl. No.: 17/285,452

(22) PCT Filed: Apr. 8, 2020

(86) PCT No.: PCT/US2020/027266
§ 371 (c)(1),
(2) Date: Apr. 14, 2021

(87) PCT Pub. No.: WO2021/206708
PCT Pub. Date: Oct. 14, 2021

(65) Prior Publication Data
US 2022/0124398 A1 Apr. 21, 2022

(51) Int. Cl.
*H04N 21/262* (2011.01)
*H04N 21/258* (2011.01)

(52) U.S. Cl.
CPC . *H04N 21/26233* (2013.01); *H04N 21/25891* (2013.01); *H04N 21/26258* (2013.01)

(58) Field of Classification Search
CPC ........... H04N 21/258; H04N 21/25891; H04N 21/26233; H04N 21/26258; H04N 21/00
See application file for complete search history.

(56) References Cited

U.S. PATENT DOCUMENTS

| 9,106,430 B1 | 8/2015 | Zhou et al. |
| 2011/0016482 A1* | 1/2011 | Tidwell .............. G06Q 30/0251 725/35 |
| 2016/0134934 A1 | 5/2016 | Jared et al. |

FOREIGN PATENT DOCUMENTS

| CN | 1516939 | 7/2004 |
| CN | 101035264 | 9/2007 |

(Continued)

OTHER PUBLICATIONS

International Search Report for PCT Appln. Ser. No. PCT/US2020/027266 dated Feb. 11, 2021 (13 pages).

(Continued)

*Primary Examiner* — Rong Le
(74) *Attorney, Agent, or Firm* — Dority & Manning, P.A.

(57) ABSTRACT

At least one aspect of the present disclosure is directed to systems and methods of selecting and acknowledging content to broadcast. A system can receive, at a first time, a request for content to broadcast identifying a content publisher. The system can obtain cluster data of the content publisher corresponding to a first time, the cluster data identifying content selection metrics based on predicted characteristics of the cluster corresponding to the first time. The system can determine a subset of content items having cluster filtering criteria that satisfy the content selection metrics. The system can rank the subset of content items based on the content selection metrics to create an ordered list of content items. The system can transmit data identifying the order of the content items to the content publisher. The content publisher can insert the content into a broadcast in the order identified by the system.

24 Claims, 5 Drawing Sheets

(56) References Cited

FOREIGN PATENT DOCUMENTS

| | | | |
|---|---|---|---|
| CN | 101911687 | 12/2010 | |
| CN | 102498497 | 6/2012 | |
| EP | 3 419 200 | 12/2018 | |
| EP | 3419200 A1 * | 12/2018 | ............. H04H 60/31 |

OTHER PUBLICATIONS

International Preliminary Report on Patentability for Application No. PCT/US2020/027266, dated Oct. 20, 2022, 8 pages.
Machine Translated Chinese Search Report Corresponding to Application No. 202080005948.X dated Feb. 13, 2023.

* cited by examiner

SYSTEMS AND METHODS TO REDUCE ACKNOWLEDGMENT REQUESTS IN BROADCAST TRANSMISSION NETWORKS

CROSS-REFERENCE TO RELATED APPLICATIONS

The present application is a National Stage Application, filed under 35 U.S.C. 371, of International Patent Application No. PCT/US2020/027266 filed on Apr. 8, 2020 titled "SYSTEMS AND METHODS TO REDUCE ACKNOWLEDGEMENT REQUESTS IN BROADCAST TRANSMISSION NETWORKS," the entirety of which is incorporated by reference herein.

BACKGROUND

In broadcast environments, content providers can broadcast content for presentation by receiver devices in a one-to-many transmission scheme. Broadcast content providers can choose content to broadcast in a region capacity, such that the same content is broadcast to many receiver devices in a geographic broadcast area. Due to the one-to-many configuration of broadcast transmissions, it can be difficult to determine how many receiver devices access broadcast content.

SUMMARY

At least one aspect of the present disclosure is generally directed to a method of reducing acknowledgement requests in broadcast transmission networks. The method can be performed, for example, by a data processing system including one or more processors and a memory. The method can include receiving, at a first time, a request for content to broadcast. The request can identify a content publisher. The method can include obtaining, cluster data of the content publisher corresponding to the first time. The cluster data can identify content selection metrics based on predicted characteristics of the cluster of the content publisher corresponding to the first time. The cluster data can be used to and used to select the content to broadcast. The method can include determining, from a plurality of content items, a subset of content items. Each content item of the subset of content items can have cluster filtering criteria that satisfy the content selection metrics. The method can include ranking, based on the content selection metrics and the cluster filtering criteria of each content item of the subset of content items, the subset of content items to create an order of the content items included in the subset of content items. The method can include transmitting, to the content publisher, data identifying the order of the content items. The content publisher can use the order to broadcast each content item included in the subset.

In some implementations, the method can include receiving candidate cluster information. In such implementations, the method can further include updating, the cluster data using the candidate cluster information. In some implementations, the method can include receiving content information from the content publisher. In such implementations, the method can further include accessing each content item of the plurality of content items to determine the respective cluster filtering criteria. In such implementations, the method can further include comparing each of the respective cluster filtering criteria to the cluster data to determine that the cluster filtering criteria satisfies the content selection metrics. In such implementations, the method can further include selecting the respective content item to be included in the subset responsive to the determination that the cluster filtering criteria satisfies the content selection metrics.

In some implementations, each of the plurality of content items can be associated with a respective duration value. In such implementations, the method can further include comparing the respective duration value associated with each of the plurality of content items to a duration threshold to create a filtered set of content items. In such implementations, the method can further include determining, from the filtered set of content items, the subset of content items. Each content item of the subset of content items having cluster filtering criteria that satisfies the content selection metrics. In some implementations, ranking the subset of content items is further based on at least one of a respective content item expiration value, a respective content item duration value, or a respective content item access count value. In some implementations, the method can further include transmitting the subset of content items to be broadcast by the content publisher in a broadcast stream. In some implementations, the method can further include accessing, by the data processing system, from a database, a data record associated with the publisher to obtain the cluster data of the content publisher. In some implementations, the method can further include receiving, from the content publisher, an acknowledgement request including characteristics of the cluster of the content publisher. In some implementations, the method can further include updating a data structure associated with the content publisher and the subset of content items based on the characteristics of the cluster of the content publisher included in the acknowledgement request.

At least one other aspect of this technical solution is directed to a system for reducing acknowledgement requests in broadcast transmission networks. The system can include one or more processors coupled to a memory. The system can receive, at a first time, a request for content to broadcast. The request can identify a content publisher. The system can obtain cluster data of the content publisher corresponding to the first time. The cluster data can identify content selection metrics based on predicted characteristics of the cluster of the content publisher corresponding to the first time. The cluster data can be used to select the content to broadcast. The system can determine, from a plurality of content items, a subset of content items. Each content item of the subset of content items having cluster filtering criteria that satisfy the content selection metrics. The system can rank, based on the content selection metrics and the cluster filtering criteria of each content item of the subset of content items, the subset of content items to create an order of the content items included in the subset of content items. The system can transmit, to the content publisher, data identifying the order of the content items. The content publisher can use the order to broadcast each content item included in the subset.

In some implementations, the system can receive candidate cluster information. In such implementations, the system can update the cluster data using the candidate cluster information. In some implementations, the system can receive content information from the content publisher. In such implementations, the system can access each content item of the plurality of content items to determine the respective cluster filtering criteria. In such implementations, the system can compare each of the respective cluster filtering criteria to the cluster data to determine that the cluster filtering criteria satisfies the content selection metrics. In some implementations, the system can select the respective content item to be included in the subset responsive to the determination that the cluster filtering criteria satisfies the content selection metrics.

In some implementations, the system can each of the plurality of content items are associated with a respective duration value, and the system can compare the respective duration value associated with each of the plurality of content items to a duration threshold to create a filtered set of content items. In such implementations, the system can determine, from the filtered set of content items, the subset of content items. Each content item of the subset of content items can have cluster filtering criteria that satisfies the content selection metrics. In some implementations, the system can rank the subset of content items based on at least one of a respective content item expiration value, a respective content item duration value, or a respective content item access count value. In some implementations, the system can transmit the subset of content items to be broadcast by the content publisher in a broadcast stream. In some implementations, the system can access, from a database, a data record associated with the publisher to obtain the cluster data of the content publisher, in some implementations, the system can receive, from the content publisher, an acknowledgement request including characteristics of the cluster of the content publisher. In some implementations, the system can update a data structure associated with the content publisher and the subset of content items based on the characteristics of the cluster of the content publisher included in the acknowledgement request.

At least one other aspect of this technical solution is directed to a non-transitory computer storage medium encoded with instructions executable by one or more processors. The instructions can cause the one or more processors to receive, at a first time, a request for content to broadcast. The request can identify a content publisher. The instructions can cause the one or more processors to obtain cluster data of the content publisher corresponding to the first time. The cluster data can identify content selection metrics based on predicted characteristics of the cluster of the content publisher corresponding to the first time. The cluster data can be used to select the content to broadcast. The instructions can cause the one or more processors to determine, from a plurality of content items, a subset of content items. Each content item of the subset of content items can have cluster filtering criteria that satisfy the content selection metrics. The instructions can cause the one or more processors to rank, based on the content selection metrics and the cluster filtering criteria of each content item of the subset of content items, the subset of content items to create an order of the content items included in the subset of content items. The instructions can cause the one or more processors to transmit, to the content publisher, data identifying the order of the content items, the content publisher using the order to broadcast each content item included in the subset.

In some implementations, the instructions can further cause the one or more processors to receive candidate cluster information. In such implementations, the instructions can further cause the one or more processors to update the cluster data using the candidate cluster information. In some implementations, the instructions can further cause the one or more processors to receive content information from the content publisher. In such implementations, the instructions can further cause the one or more processors to access each content item of the plurality of content items to determine the respective cluster filtering criteria. In such implementations, the instructions can further cause the one or more processors to compare each of the respective cluster filtering criteria to the cluster data to determine that the cluster filtering criteria satisfies the content selection metrics. In such implementations, the instructions can further cause the one or more processors to select the respective content item to be included in the subset responsive to the determination that the cluster filtering criteria satisfies the content selection metrics.

In some implementations, each of the plurality of content items are associated with a respective duration value, and the instructions can further cause the one or more processors to compare the respective duration value associated with each of the plurality of content items to a duration threshold to create a filtered set of content items. In such implementations, the instructions can further cause the one or more processors to determine, from the filtered set of content items, the subset of content items, each content item of the subset of content items having cluster filtering criteria that satisfies the content selection metrics. In some implementations, the instructions can further cause the one or more processors to rank the subset of content items further based on at least one of a respective content item expiration value, a respective content item duration value, or a respective content item access count value. In some implementations, the instructions can further cause the one or more processors to transmit, to the content publisher, the subset of content items to be broadcast by the content publisher in a broadcast stream. In some implementations, the instructions can further cause the one or more processors to access, from a database, a data record associated with the publisher to obtain the cluster data of the content publisher. In some implementations, the instructions can further cause the one or more processors to receive, from the content publisher, an acknowledgement request including characteristics of the cluster of the content publisher. In some implementations, the instructions can further cause the one or more processors to update a data structure associated with the content publisher and the subset of content items based on the characteristics of the cluster of the content publisher included in the acknowledgement request.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect.

BRIEF DESCRIPTION OF THE DRAWINGS

The accompanying drawing are not intended to be drawn to scale. Like reference numbers and designations in the various drawings indicate like elements. For purposes of clarity, not every component may be labeled in every drawing. In the drawings.

DETAILED DESCRIPTION

Figure 1:
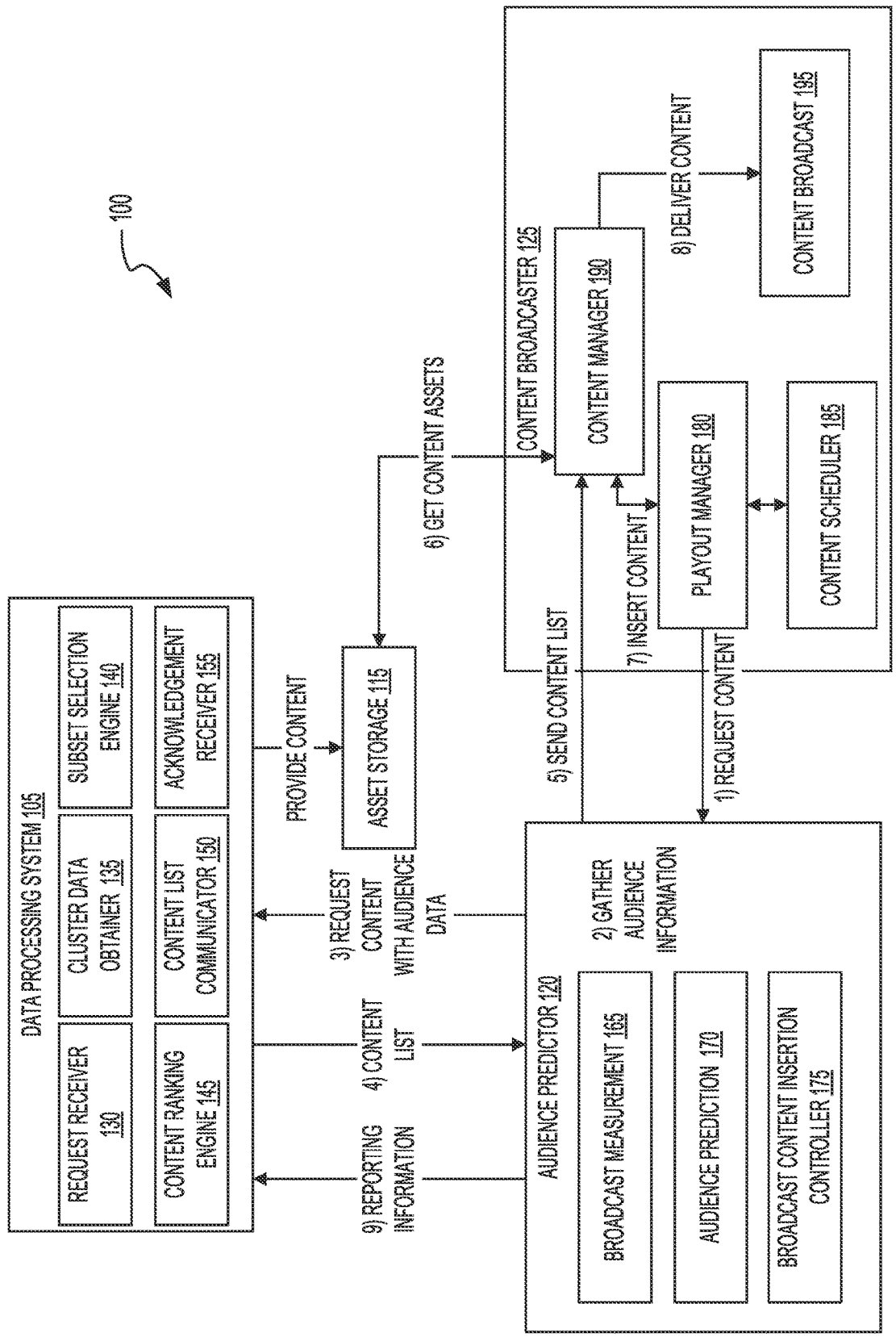
FIG. 1 shows a block diagram depicting an example system flow diagram for reducing acknowledgement requests in broadcast networks.

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Content publishers providing broadcast transmissions can broadcast content to many receiver nodes simultaneously. Receiver nodes (e.g., cable boxes, radios, etc.) can receive content broadcast by content publishers and present the content, for example via a display or a speaker. The receiver nodes can be accessed by many different users of an audience, each with different preferences, backgrounds, demographic information, and other characteristics. Content publishers typically provide broadcast content in a regional capacity, and can tailor their content on a macroscopic level to different regions based on predicted characteristics of the audience at the time of the broadcast. The predicated audience data (e.g., the predicted audience characteristics, other information related to the audience or broadcast content, etc.) can refer to the expected number of receiver nodes that access the content broadcast by the content publisher, expected characteristics of the users of the receiver nodes, and other expected information regarding the content or the content network.

However, selecting content to broadcast based on predicted audience data is challenging, because the best choice of content must be tailored to the actual characteristics of an entire audience at the time of the broadcast. This issue arises in broadcast content environments, because content broadcasting networks are not typically configured to provide content to each receiver node on a one-to-one basis. Instead, content providers can broadcast the same or similar content to all receiver nodes in a particular region. As such, content publishers need to make informed decisions about what content to select based on the predicted audience data, which may be provided as far as weeks in advance. Because the content streams are decided far in advance, the predicted audience data may not accurately reflect the number or characteristics of the audience that actually accesses the broadcast content streams. Changing audience preferences, characteristics, and other factors can cause discrepancies between the predicted audience data and the actual characteristics of the audience at the time of the broadcast.

To address the foregoing issues, the systems and methods of this technical solution can dynamically select, order, and acknowledge viewership or access of broadcast content for content publishers in real-time. When a content publisher wants to modify their content stream to reflect expected access information from receiver nodes, the content publisher can submit a request for ranked and ordered content from the system. Based on the information in the request, the system can determine a subset of content to add or incorporate in the broadcast stream of the content publisher. The system can transmit the subset of content back to the content publisher for further analysis. The content publisher can provide, based on information accessed from the receiver nodes in communication with the content publisher, receiver node information reflecting access to the broadcast stream of the content publisher.

Using the receiver node information and metadata associated with the broadcast content stream of the content publisher, the system can rank the subset of content items to determine an order in which the content will be broadcast. The system can transmit the order, along with content identifiers, content duration information, and other information, to the content publisher. The content publisher can then accept and insert the ordered broadcast content into the content stream for presentation via the receiver nodes. After broadcasting the updated content stream to the receiver nodes, the content publisher can provide a single acknowledgement including updated receiver node information reflecting actual access of the content stream by the receiver nodes. This is an improvement over one-to-one content provider systems that use an acknowledgement for each device that accesses the content, because this technical solution can provide a single acknowledgement that represents an acknowledgement of a large group of receiver nodes that accessed the broadcast stream. The system can then confirm the actual access of the content stream by the receiver nodes by parsing the single acknowledgement, and record the access events in a database associated with the content publisher.

Accordingly, the technical solution described herein can thus provide increased computational performance and reduce overall network utilization when compared with other content selection systems. Instead of confirming access of the broadcast stream on a one-to-one basis with each receiver node, the system can confirm the access events of all receiver nodes in communication with the content publisher by confirming the single request. This reduces the computational load on broadcast content selection and modification systems, and decreases the overall network traffic between receiver nodes and broadcast content systems. Furthermore, by only transmitting receiver node information that acknowledges the access of the content stream, this technical solution increases the overall security of broadcast content systems, because protected or private information does not leave the secure communication channel between the receiver node and the content publisher. Thus, the information associated with the receiver node is not susceptible to data breaches or man-in-the-middle attacks, which is an improvement over other broadcast content systems.

Broadcast networks (e.g., television, radio, internet livestreams, etc.) has high access among receiver devices in regions across the world. Broadcast content can be distributed using any number of standards (e.g. the Digital Video Broadcasting (DVB) standards, the Advanced Television Systems Committee (ATSC) standards, Integrated Services Digital Broadcasting (ISDB) standards, Digital Terrestrial Multimedia Broadcast (DTMB) standards, Digital Multimedia Broadcasting (DMB) standards, frequency modulation (FM) broadcasting, amplitude modulation (AM) broadcasting, Digital Audio Broadcasting (DAB) standard, HyperText Markup Language 5.0 (HTML5), etc.) and received by receiver devices that are configured to receive broadcast signals. Some receiver devices, such as smart televisions, smart radios, and other computing devices, can include built-in tuners to receive broadcast signals as well as internet connectivity which can enable the devices to download per-broadcaster (e.g., or per channel, etc.) HTML5 enabled applications. These applications can allow for broadcaster driven behavior such as dynamic overlays, supplemental content, and video overlays.

Broadcast access by receiver devices can be tracked by an audience predictor computing device (e.g., the audience predictor 120, etc.) that can communicate with an application executing on the receiver devices. The application can send a heartbeat signal to a datacenter associated with the audience predictor computing device, or to the audience predictor computing device itself. The audience predictor computing device can aggregate these heartbeat signals, and their associated information, to accuracy estimate the access of broadcast content by receiver devices in a particular region. Broadcast content providers can leverage this estimated measurement information to select and include relevant content in regional broadcast streams.

The systems and methods of this technical solution can identify, select, rank, and provide lists of content for a one-to-many broadcast environment. The identification and selection can be based on estimated audience profile information, and information provided by broadcast content providers. The systems and methods described herein can maintain an estimated audience data pipeline that can include predictions about the access of broadcast content at various times by receiver devices. The identified and selected content can be further ranked by comparing the distinct audience data to the metadata information available for each content item. After recommending the content to content providers, the systems and methods of this technical solution can acknowledge access of the selected content by multiple receiver devices in a single acknowledgement message. The acknowledgement message can identify a total number of receiver devices that accessed the content, and the systems and methods can record the acknowledgement message in one or more data structures in association with an identifier of the broadcast content provider.

Referring now to FIG. 1, depicted is an example system 100 for reducing acknowledgement requests in broadcast networks. The system 100 can include at least one data processing system 105, at least one asset storage 115, at least one audience predictor 120, and at least one content broadcaster 125. The data processing system 105 can include at least one request receiver 130, at least one cluster data obtainer 135, at least one subset selection engine 140, at least one content ranking engine 145, at least one content list communicator 150, and at least one acknowledgement receiver 155. The audience predictor 120 can include at least one broadcast measurement 165, at least one audience prediction 170, and at least one broadcast content insertion controller 175. The content broadcaster 125 can include at least one playout manager 180, at least one content scheduler 185, at least one content manager 190, and at least one content broadcast 195.

Figure 5:
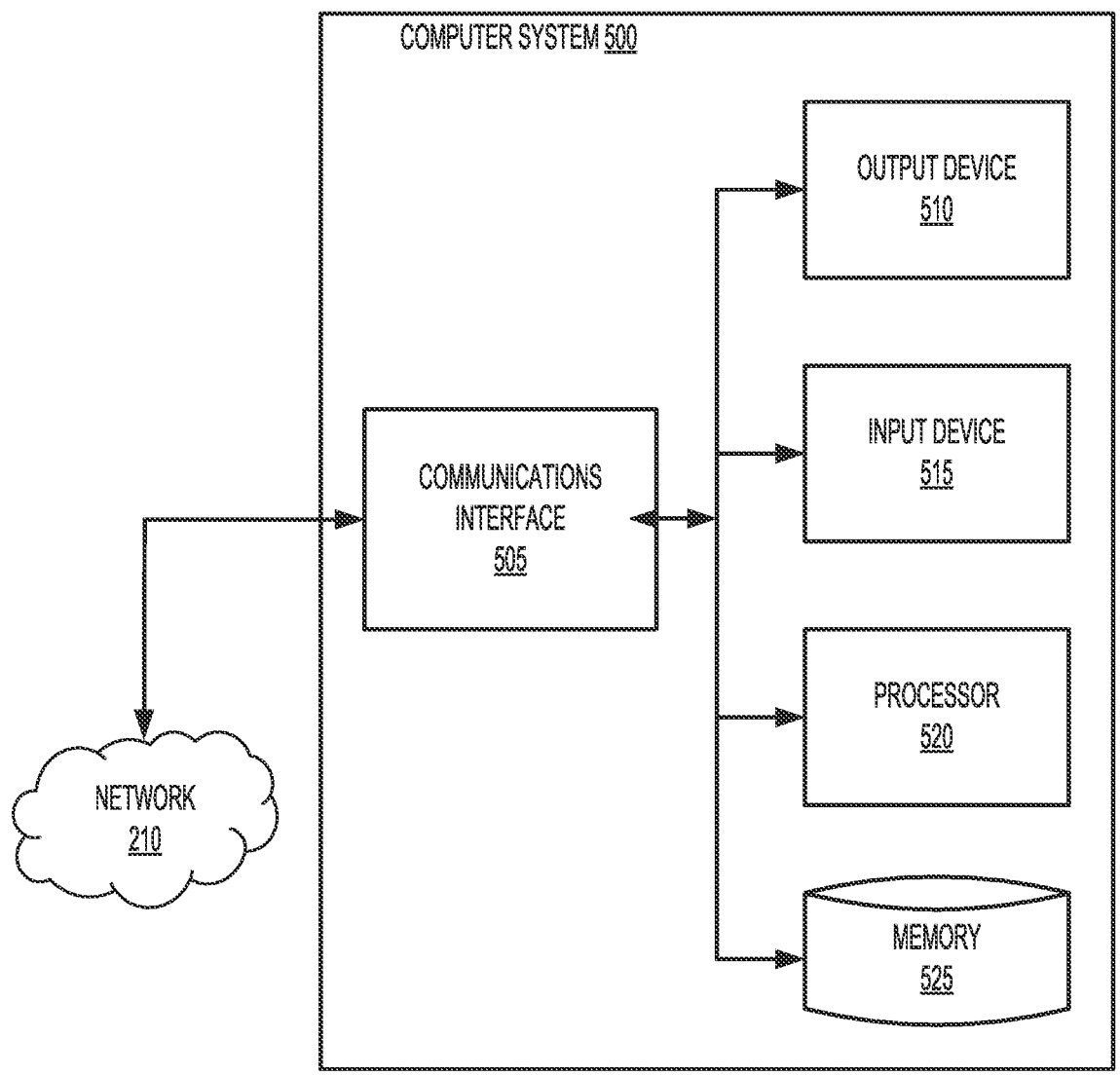
FIG. 5 shows the general architecture of an illustrative computer system that may be employed to implement any of the computers discussed herein.

Each of the components (e.g., the data processing system 105, the asset storage 115, the audience predictor 120, the content broadcaster 125, the request receiver 130, the cluster data obtainer 135, the subset selection engine 140, the content ranking engine 145, the content list communicator 150, the acknowledgement receiver 155, the broadcast measurement 165, the audience prediction 170, the broadcast content insertion controller 175, the playout manager 180, the content scheduler 185, the content manager 190, the content broadcast 195, etc.) of the system 100 can be implemented using hardware components or a combination of software with the hardware components of the computer system 500 detailed herein in conjunction with FIG. 5. For example, the data processing system 105 can include servers or other computing devices. The audience predictor 120 can include servers or other computing devices. The content broadcaster 125 can include servers or other computing devices. Each of the components of the data processing system 105 can perform the functionalities detailed herein.

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein.

The asset storage 115 can be a database configured to store and/or maintain any of the information described herein. The asset storage 115 can maintain one or more data structures which can contain or index each of the values, pluralities, sets, data structures, or thresholds described herein. The asset storage 115 can be accessed using one or more memory addresses or index values. The asset storage 115 can be accessed by the components of the data processing system 105, or the content broadcaster 125 via a network (e.g., the network 210 described herein in conjunction with FIG. 2, etc.). In some implementations, the asset storage 115 can be internal to the data processing system 105. In some implementations, the asset storage 115 can exist external to the data processing system 105, and may be accessed via a computer network.

The asset storage 115 can be distributed across many different computer systems or storage elements, and may be accessed via a computer network or a suitable computer bus interface. The data processing system 105 can store, in the asset storage 115, the results of any or all computations, determinations, selections, identifications, generations, constructions, or calculations, along with content items, video items, pictures, text assets, asset metadata, content item metadata, audience data (e.g., predicted, actual, real-time, forecast, etc.), message data (e.g., any data associated with any of the communications described herein in conjunction with FIGS. 1-4, etc.), in one or more data structures indexed with appropriate values, each of which may be accessed by the data processing system 105, the audience predictor 120, or the content broadcaster 125 to perform any of the functionalities or functions described herein. The data processing system 105 can store pre-encoded (e.g. configured to be inserted into a broadcast) content that can be accessed by any computing device in the system 100.

The request receiver 130 can receive one or more requests for content to broadcast from the audience predictor 120 or the content broadcaster 125. The request can reflect a first time period, or be associated with a timestamp value that reflects a time of day, year, and can include date information. The request can identify a content broadcaster (e.g., an audience predictor 120 or content broadcaster 125, etc.). The identification of a content broadcaster can include an identifier code or value that is associated with the respective content broadcaster. In some implementations, the identification can include a uniform resource identifier that includes a path to one or more resources, configuration settings, or identifiers associated with the respective content broadcaster. The request can further include information about a broadcast stream, and other broadcaster receiver criteria to usable to select content to broadcast. For example, the request can include an identifier of a broadcast channel associated with the content broadcaster. The request can include one or more key values that correspond to cluster selection metrics (e.g., the broadcast receiver characteristics, etc.). The cluster selection metrics can include information about the audience of a content broadcaster, for example, information about the users of broadcast receiver devices (e.g. broadcast receivers 220, etc.) that access the content broadcast provided by the content broadcaster. This information can include, for example, total viewership information, category identifiers (e.g., categories that correspond to various potential interests or topics, etc.), potential user interests, demographic information (e.g., age, gender, etc.), and other information about the characteristics of the audience of the content broadcaster.

The cluster data obtainer 135 can obtain cluster data about the content publisher from the audience predictor 120 or the content broadcaster 125. To identify content items to include in the broadcast stream of the content publisher that are relevant to the audience of the content publisher (e.g., the content broadcaster 125), the cluster data obtainer can obtain audience data (e.g., cluster data, receiver device information, etc.). In some implementations, the cluster data obtainer 135 can access one or more database entries in the memory of the data processing system 105 to identify cluster data, which may comprise specific data about audience viewership characteristics during a particular time period for the associated content publisher. A cluster may refer to an audience of a content publisher. For example, the cluster may comprise one or more receiver devices configured to receive a broadcast from the content publisher, which may be a content broadcaster. Cluster data may be considered as a predicted characteristic of a particular cluster of the content publisher corresponding to a particular time. Cluster data may comprise receiver node access data. The cluster data obtainer 135 can identify category groups that are associated with each of the content items in the asset storage, and access the database entries of content publisher audience information based on the content groups. The content groups can include at least one category identifier identified in request for content to broadcast received by the request receiver 130. In some implementations, the cluster data obtainer 135 can update the cluster data based on information received from the audience predictor 120. For example, the audience predictor 120 can periodically provide updated cluster data (e.g., candidate cluster information) to the cluster data obtainer 135. The cluster data obtainer 135 can receive the updated cluster data, and update and store the cluster data in one or more data structures the data processing system 105.

In some implementations, the cluster data obtainer 135 can transmit one or more requests to the audience predictor 120 or the content broadcaster 125 to obtain the cluster data. The request can include one or more proposed content selection metrics or categories. The content selection metrics or categories can be identified by the cluster data obtainer by identifying one or more content items that correspond to the key values received by the request receiver 130 in the request for content to broadcast. For example, the request for content to broadcast can include identifiers of categories or demographics that are relevant to the respective content publisher. The cluster data obtainer 135 can access a database (e.g., the asset storage 115), to identify one or more content items that are associated with at least one of those category identifiers. In order to determine which of those content items to recommend for broadcast, the cluster data obtainer 135 can transmit one or more requests for audience information associated with each category identifier associated with the one or more content items. Each of the content groups can be organized in a computer-readable format, for example, a JavaScript Object Notation (JSON) format. The request can be a list of category groups that each include one or more category or demographic identifier. These category groups may also be referred to as line items. Each category group can correspond to at least one content item in the asset storage 115.

After providing the request for audience data to the audience predictor 120 or the content broadcaster 125, the cluster data obtainer 135 can receive one or more messages from the audience predictor 120 or the content broadcaster 125. The messages can include audience information that corresponds to each of the content groups provided in the respective request. For example, if the request included a content group (e.g., or a line item, etc.) can include the following categories: female, age 18-49, and an interest in football. The corresponding response message from the audience predictor 120 or the content broadcaster 125 can include information about audience of the content publisher at the particular time that corresponds to each of those categories. This information can be a forecast, or estimate, of viewership or access to the broadcast stream at the time indicated by the request. In some implementations, the cluster data (e.g., audience information) can reflect the real-time viewership or access to the broadcast stream of the audience at the time of the request. Each category group included in the request for the cluster data can be associated with different viewership or access numbers. Accordingly, the response message received from the audience predictor 120 or the content broadcaster 125 can include the viewership information for each content category group in the request. The response message can further include details about the broadcast slot in which the selected content will be inserted. This information can include a start time stamp, a stop timestamp, minimum content duration values, maximum content duration values, and a total slot duration value, among others. The response message can also identify additional information about the content broadcaster 125, for example additional channel metadata. The metadata can include information about what is being broadcast by the content publisher, including broadcast content, content schedules (e.g., when particular content is broadcast, etc.), the broadcast medium (e.g., internet livestream, television broadcast, cable television broadcast, radio broadcast, etc.), and other information about the content broadcaster 125.

The subset selection engine 140 can select a subset of the content items stored in the asset storage to insert the broadcast content of the content broadcaster 125. Selecting the subset can include accessing the asset storage 115 to identify content items associated with each of the content groups identified by the cluster data obtainer 135. Each of the content items in the asset storage 115 can be associated with respective cluster filtering criteria. For example, certain content items may include category identifiers, keywords, metadata, or other information related to audience characteristics as described herein. Accordingly, the content item can be associated cluster filtering criteria that can be compared with predicted audience characteristics, and some content items can be more closely associated with those characteristics than other content items. The subset selection engine 140 can determine a weight value for each of the content items that indicates how similar the cluster filtering criteria of the content item are to the predicted audience characteristics. To identify whether the subset selection engine 140 should select a content item for inclusion the subset, the subset selection engine 140 can compare the weight value to a subset threshold value. The subset threshold value can be maintained in the memory of the data processing system. If the weight value is greater than or equal to the subset threshold value, the subset selection engine 140 can include the respective content item in the subset. Otherwise, the content item can be excluded from the subset.

The subset selection engine 140 can further narrow the content items based on the duration of each of the one or more content items. The subset selection engine 140 can receive content slot duration information in the request from the audience predictor 120. To determine whether the content items selected in the subset satisfy the duration requirements (e.g., the content items are not too long, not too short, etc.), the subset selection engine 140 can compare the duration values associated with each content item to the content slot duration information to create a filtered set of content items. The subset selection engine 140 can then select the subset from the filtered set of content items as described herein (e.g., based on content filtering criteria, a content selection model, etc.). The subset selection engine 140 can select the content items to include in the subset based on an expiration value. For example, if the content item is associated with a value that indicates the content item will expire soon, the subset selection engine 140 may include that content item in the subset. Each content item can be associated with a total access value that indicates a total number of presentations to receiver devices. The data processing system 105 can update the total number of presentation using the number of receiver nodes indicated in acknowledgement messages received from the audience predictor 120. In some implementations, the subset selection engine 140 can select a content item for inclusion in the subset if that content item is associated with a total access value that is less than a predetermined threshold.

The subset selection engine 140 can select content items to include in the subset based on the output of a content selection model (e.g., linear regression, Bayesian optimization, neural network, deep neural network, etc.). The content selection model can use the cluster filtering criteria of each content item, along with the audience data received from the audience predictor 120 as inputs to the model. The model can output, for example, a value that indicates whether the content item should be included in the subset. In some implementations, based on the input to the model, the model can output one or more pointers or an identifiers of content items to include in the subset.

The content ranking engine 145 can rank each of the selected content items using the content metrics associated with each of the content items and the information included in the message received by the cluster data obtainer 135. To rank each the content items of the subset of content items, the content ranking engine 145 can compare various characteristics of the content items to characteristics of the broadcast stream, audience data, and the characteristics of the other content items of the subset, among others as described herein. For example, the ranked order of the subset of the content items can be determined based on the viewership of the category group associated with the content items. Ranking the content items can further be based on duration of the content items. For example, content items that associated with a larger duration value can be placed near the bottom of the order, and content items that are associated with a shorter duration value can be placed at the top of the order, or vice-versa. In some implementations, the content ranking engine 145 can include further rank the content items based on additional values, for example, conversion likelihood values, engagement values, and other metrics to the viewership or impact of a content item.

The content list communicator 150 can transmit, provide, or otherwise communicate the ranked ordered list of the content items to the audience predictor 120. The list of content items can include a list of identifiers of the content items, for example a list of uniform resource identifiers that point to content in the asset storage 115. In some implementations, the content list communicator 150 can access the asset storage 115 can retrieve the content items identified in the list of content items. Then, in lieu of transmitting the list of content identifiers, the content list communicator 150 can transmit, provide, or otherwise communicate the content items themselves to at least one of the audience predictor 120 or the content broadcaster 125. If received by the audience predictor 120, the audience predictor can forward the content items to the content broadcaster 125 for insertion in the content broadcast 195. If the content broadcaster 125 receives content items, it need not retrieve the content from the asset storage 115, and can encode and insert, or simply insert, the content as per the markers indicated in the broadcast stream.

The acknowledgement receiver 155 can receive acknowledgement data messages associated with each of the ranked content items from the audience predictor 120 or the content broadcaster 125. The acknowledgement messages can acknowledge access or viewership of a content item provided by the data processing system 105 after it has been broadcast by the content broadcaster 125. To gather the viewership or access data of the broadcast stream, the content broadcaster 125 or the audience predictor 120 can maintain a record of number of viewers that access the content stream. The acknowledgement receiver 155 can compare the actual viewership or access data of the broadcast stream with the predicted audience data received from the audience predictor 120 to determine feedback data to send to the audience predictor 120. In some implementations, the subset selection engine 140 can further train the model used to select the subset using the feedback data determined by the acknowledgement receiver 155. The acknowledgement receiver 155 can store, in one or more data structures, the total actual viewership information, the order of the subset of content items provided to the audience predictor 120 or the content broadcaster 125, and content item metadata in association with the content publisher in the memory accessible by the data processing system 105.

The audience predictor 120 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein.

The content broadcaster 125 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein.

Figure 2:
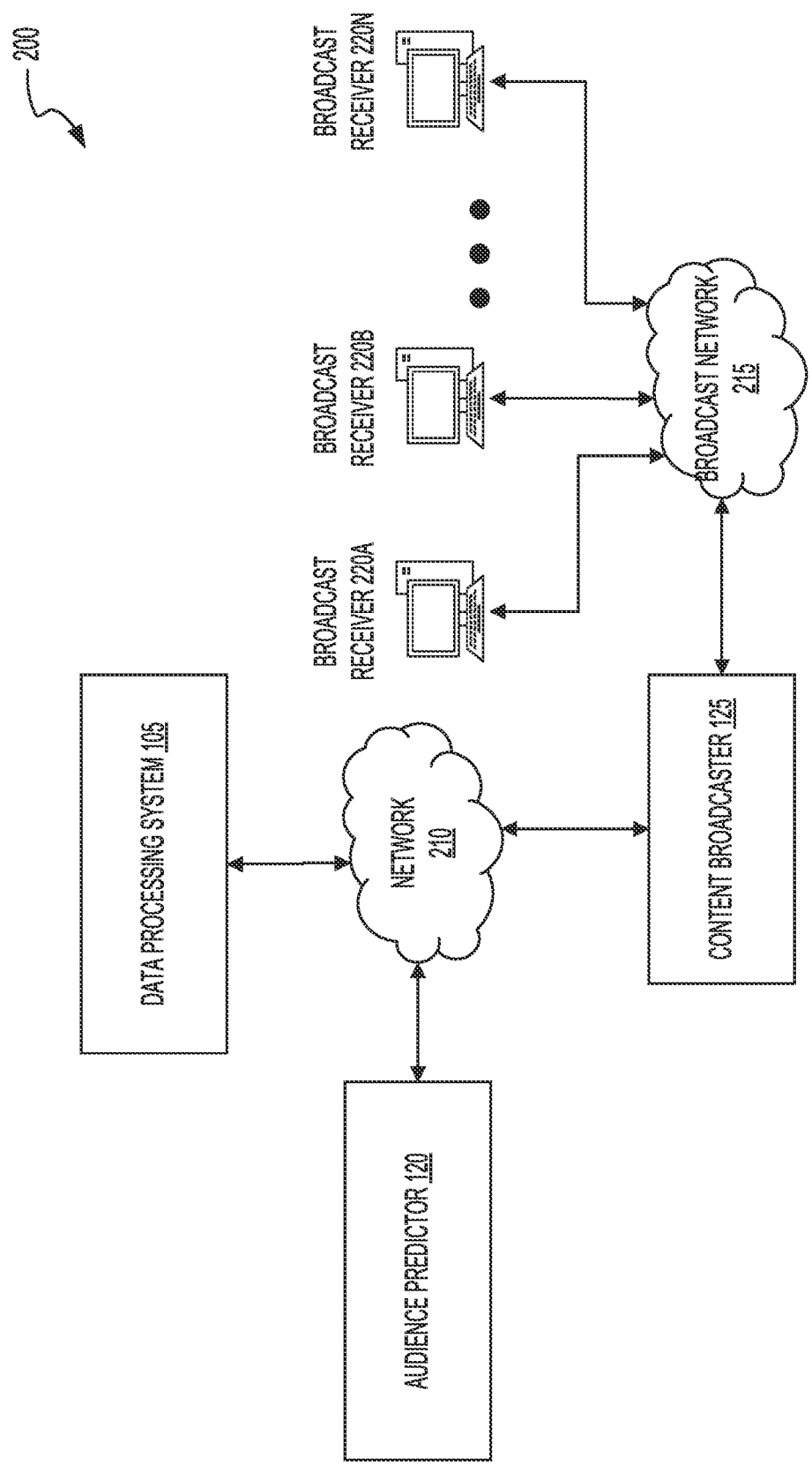
FIG. 2 shows a block diagram depicting an example system for the prediction and selection of content in broadcast networks.

The content scheduler 185 can schedule, or pre-encode, broadcast content to be transmitted to receiver devices (e.g., the broadcast receivers 220A-N described herein in conjunction with FIG. 2). The content scheduler 185 can access one or more databases to retrieve content to broadcast, and create a schedule, or order, in which to broadcast the content to other devices. Broadcast content can include one or more markers (e.g., time related data, etc.) that can indicate that content should be inserted in a particular place in the content stream. When scheduling the broadcast content, the content scheduler 185 can determine scheduled time periods (e.g., time stamps, etc.) where content should be inserted from the asset storage 115. The content scheduler 185 can generate one or more markers (e.g., metadata inserted into the broadcast stream accessible by other components of the content broadcaster 125, timestamps and duration information, etc.) to insert into the scheduled content stream. The content scheduler 185 can create the broadcast content schedule at a time before the content is broadcast to the receiver devices. The markers inserted by the content scheduler 185 can indicate durations of the content stream where content should be inserted just prior to the broadcast of that portion of content. The content scheduler 185 can provide the content schedule to the other modules in the content broadcaster 125 (e.g., the playout manager 180, the content manager 190, etc.).

The play out manager 180 can monitor the playout of the content broadcast 195 that is broadcast based on the content broadcast schedule generated by the content scheduler 185. Monitoring the content broadcast 195 can include accessing portions of the content broadcast schedule that are not yet broadcast in the content broadcast 195. By accessing not-yet broadcasted portions of the content schedule, the playout manager 180 can determine if there are any markers (e.g., SCTE-35 marker, cue tone marker, etc.) close in temporal proximity to the broadcast time (e.g., markers indicating that 30 seconds of content should be inserted in broadcast at a certain time, etc.). If a marker to insert content in the broadcast stream is detected in the content schedule within a certain time period (e.g., insert 40 seconds of content to be broadcast in 30 seconds, 45 seconds, 2 minutes, etc.), the play out manager 180 can generate and transmit a request for content to the audience predictor 120. The request can include, for example, an identifier of the content broadcaster 125, a duration of the content to be inserted (e.g., a content slot duration, etc.), a content identifier identifying content that is broadcasted by the content broadcaster 125, and a time stamp (e.g., time, date, etc.), among other information.

The audience predictor 120 can receive the request for content, and begin to gather audience data (e.g., metadata about receiver devices, etc.) in response to the request. The broadcast measurement 165 can be an up-to-date (e.g., last minute, last five minutes, last hour, real-time, etc.) estimation of the number of receiver nodes accessing the broadcast. This information can be updated by the audience predictor 120 (e.g., in real-time, on a periodic basis, etc.) by the audience predictor based on heartbeat signal received by the receiver devices. The broadcast measurement 165 can include information parsed and aggregated from the heartbeat signals received from the receiver devices, and can include profile information, demographic information, access information (e.g., access time, access duration, types of accessed broadcast content, broadcast content identifiers, etc.), other information about the receiver devices, such as identifiers and metadata. The audience predictor 120 scan store, update, and otherwise access the data in the broadcast measurement 165 in one or more data structures in the memory of the audience predictor 120.

The audience prediction 170 can be an up-to-date prediction of audience receive device characteristics. The audience prediction 170 can include predictions about the audience characteristics for a particular broadcast during a particular time period. The audience prediction 170 can be based on previous data, or data that is gathered and included in the broadcast measurement 165. The audience prediction 170 can include, for example, information about user profiles associated with receiver devices that access the content broadcast 195, including demographic information, access duration information, access time information, interest categories associated with receiver devices, and other information. The audience predictor 120 can update the audience prediction, for example, on a real-time basis, a periodic basis, or in response to one or more messages received from at least one computing device of the system 100. For example, the audience prediction 170 can indicate the predicted demographics or characteristics associated with the receiver devices accessing a content broadcast during a given time period. The audience predictor 120, in response to a request, can aggregate the heartbeat signals, and information associated with the receiver devices transmitting the heartbeat signals, to determine the demographics and characteristics associated with the receiver nodes. Based on current and historical access information, and other information in the heartbeat signals as described herein, the audience predictor 120 can update or maintain the audience prediction 170 in one or more data structures in the memory of the audience predictor 120.

The broadcast content insertion controller 175 can transmit or forward the request for content to the data processing system 105, along with audience data that is based on the broadcast measurement 165 and the audience prediction 170. For example, the request transmitted to the data processing system 105 can include information about audience or receiver device cluster characteristics derived from the broadcast measurement 165 or data included in the audience prediction 170. In some implementations, the broadcast content insertion controller can transmit the entirety of the broadcast measurement 165 and the audience prediction 170 for the time period associated with the request for content to broadcast. The receiver device characteristics, or cluster data, can indicate different characteristics about the receiver nodes, for example demographic information, access duration information, access time information, interest categories associated with receiver devices, and other information about the users of the receiver devices.

In some implementations, the response to the request for content can be one or more category groups, or line items, that indicate relevant groups of content categories that could correspond to potential content to be broadcast. In response to receiving the content groups, the broadcast content insertion controller 175 can access the broadcast measurement 165 data and the audience prediction 170 data to determine refined audience characteristics (e.g., viewership or access information, user profile information, etc.) that correspond to the content category groups. For example, for a particular content category, the broadcast content insertion controller 175 can determine the number of receiver nodes that are associated with the categories in the content category group. The broadcast content insertion controller 175 can transmit the refined audience characteristics data, along with additional content slot information, to the data processing system 105. The additional content slot information can include metadata about the content that is requested, for example a maximum content duration, a minimum content duration, and a total content slot duration, among others.

The broadcast content insertion controller 175 can receive a list of content, for example an ordered list of content, from the data processing system in response to the request for content. The list of content can correspond to the request for content to broadcast, and can reflect or satisfy the audience characteristics and content slot information provided to the data processing system 105. The list of content can be an ordered list of content identifiers, for example, an ordered list of uniform resource identifiers (URI) that point to the content in the asset storage 115. The list of content can include content metadata, such as categories associated with the content, the order the content should be broadcast, and the duration of each content item in the list of content, among others. The broadcast content insertion controller 175 can translate the list of content into a format that is usable by the content broadcaster 125. For example, the broadcast content insertion controller 175 can remove information from the list, or format the list of content to conform to a format specified by the content broadcaster 125. This can include, for example, parsing the list of content to extract the content identifiers, generating a list in the format specified by the content broadcaster 125, and inserting each of the extracted content identifiers in the list of content for the content broadcaster 125. The broadcast content insertion controller 175 can then transmit the list of the content, formatted or otherwise, to the content broadcaster 125 for insertion into the content broadcast 195.

The content manager 190 can receive the list of content to broadcast form the audience predictor 120, and can parse the list to extract one or more content identifiers. Each of the content identifiers can point to one or more content items stored in the asset storage 115. The content broadcaster 125 can access the asset storage 115 using the content identifiers (e.g., as key values for in a database, etc.) to identify and retrieve the content items identified in the list. Retrieving the content items can include identifying a format of the content broadcast 195 (e.g., radio, television, standard definition, high definition, 4K, 8K, etc.). In some implementations, after identifying the format of the content broadcast, the content manager 190 can use the format to access the content item in the asset storage 115 that corresponds to both the format and the content identifier. For example, the asset storage 115 can maintain different formats for each content item associated with a content identifier. To select the content item can corresponds to the format of the content broadcast 195, the content manager 190 can access the asset storage to select the content item that has a format that is the same as that of the content broadcast 195. In some implementations, the content manager 190 can encode the content retrieved from the asset storage 115 to be the same as that of the content broadcast 195.

The content manager 190 can use information received from the playout manager 180 to insert content into the content broadcast 195. The information can include cue tone requests, or markers that indicate where in the content broadcast 195 to insert the content items identified in the list. For example, the playout manager 180 can indicate that there is a content slot upcoming in the content broadcast 195 in which content can be inserted. The content manager 190 can use the markers, or indicators, to splice, stitch, or otherwise insert the content items retrieved from the asset storage 115 to the content broadcast 195. Inserting the content to the content broadcast can include, for example, splicing in an MPEG-TS content item to the stream to create a complete content stream. After the one or more content items have been inserted into the content broadcast 195, the content broadcaster 125 can broadcast the content to one or more receiver devices.

The content broadcast 195 can be, for example, an MPEG-TS video that is broadcast over a broadcast network to one or more video receiver devices as described herein. The content broadcast can also include audio streams, such as radio, or internet livestream, such as HTML5 compatible live streams. The content broadcaster 125 can broadcast the content broadcast 195 over one or more broadcast networks coupled to the content broadcaster, as illustrated in FIG. 2. After, or while, the inserted content is broadcast to the receiver devices, the audience predictor 120 can monitor and determine the number of receiver nodes that accessed the broadcast during the presentation of the inserted content. The audience predictor can then send an acknowledgement message including the number of receiver nodes that accessed the broadcast during the presentation of the inserted content to the data processing system 105.

Referring now to FIG. 2, depicted is an example high-level system 200 for the prediction of device access and selection of content in broadcast networks. The system 200 can be, include, or otherwise incorporate any or all of the devices, systems, methods, or components present in system 100. The system 200 can include at least one data processing system 105, at least one audience predictor 120, at least one content broadcaster 125, at least one network 210, at least one broadcast network 215, and at least one or more broadcast receivers 220A-N (sometimes generally referred to as broadcast receivers 220 or broadcast receiver 220).

The network 210 can include computer networks such as the Internet, local, wide, metro or other area networks, intranets, satellite networks, other computer networks such as voice or data mobile phone communication networks, and combinations thereof. The data processing system 105 of the system 200 (or the system 100) can communicate via the network 210, for instance with at least one content broadcaster 125 and at least one audience predictor 120. The network 210 may be any form of computer network that relays information between the content broadcaster 125, data processing system 105, the audience predictor 120, and one or more content sources, such as web servers, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Ant of the data processing system 105, the audience predictor 120, or the content broadcaster 125 may communicate wirelessly (e.g., via WiFi, cellular, radio, etc.) with a transceiver that is hardwired (e.g., via a fiber optic cable, a CAT5 cable, etc.) to other computing devices in the network 210. Each of the broadcast receivers 220A-N can communicate via the network 210 to the audience predictor 120 to send messages (e.g., heartbeat signals, etc.).

The broadcast receivers 220 can be a computing device configured to communicate via the network 210 to provide heartbeat signals as described herein above to the audience predictor 120. The broadcast receivers 220 can be a desktop computers, laptop computers, tablet computers, smartphones, personal digital assistants, mobile devices, consumer computing devices, servers, clients, digital video recorders, a set-top box for a television, a video game console, radio, or any other computing device configured to communicate via the network 210 and broadcast network 215, among others. The broadcast receivers 220 can receive one or more broadcast transmissions from one or more content broadcasters via the broadcast network 215. The broadcast receivers 220 can receive broadcast television, video, music, internet livestream information, and other content and information via the broadcast network 215. Each of the broadcast receivers 220 can present the content received via the broadcast network 215 according to the broadcast type. For example, if the broadcast type is an audio broadcast (e.g., radio, etc.), the broadcast receivers 220 can play the audio using one or more speakers or audio presentation devices. If the broadcast type is video (e.g., television, satellite video, internet livestream, etc.), the broadcast receivers 220 can display the video (any play any associated sound) using one or more display or audio devices.

The broadcast receivers 220 can each include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The broadcast receiver 220 can each include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of each broadcast receivers 220 (e.g., a built-in display, microphone, etc.) or external to the housing of each broadcast receiver 220 (e.g., a monitor connected to each broadcast receiver 220, a speaker connected to each broadcast receiver 220, etc.). In some implementations, each broadcast receiver 220 may include an electronic display, which visually displays interfaces using interface data provided by an operating system executing on the broadcast receiver 220.

The broadcast network 215 can transmit information in a one-to-many broadcast configuration. One or more content broadcasters 125 can use the broadcast network 215 to transmit content in a broadcast configuration to the broadcast receivers 220. The broadcast network 215 can be any kind of broadcast network, and may include a satellite television network, television signal transmissions, digital television transmissions, radio transmissions, digital radio transmissions, cellular towers, cable distribution network, the Internet, or any other type of one-to-many broadcasting network. Although not pictured in FIG. 2, it should be understood that the broadcast network 215 can be a part of the network 210. The broadcast network 215 can be accessed by each broadcast receiver 220 to present one or more content broadcasts. The broadcast network 215 can facilitate content broadcasts from many content broadcasters 125 at the same time. Each broadcast receiver 220 can use configuration settings to tune in to different content broadcasts from the one or more content broadcasters 125. As such, different groups, or subsets, of broadcast receivers 220 may be presenting different content broadcasts at the same time.

Figure 3:
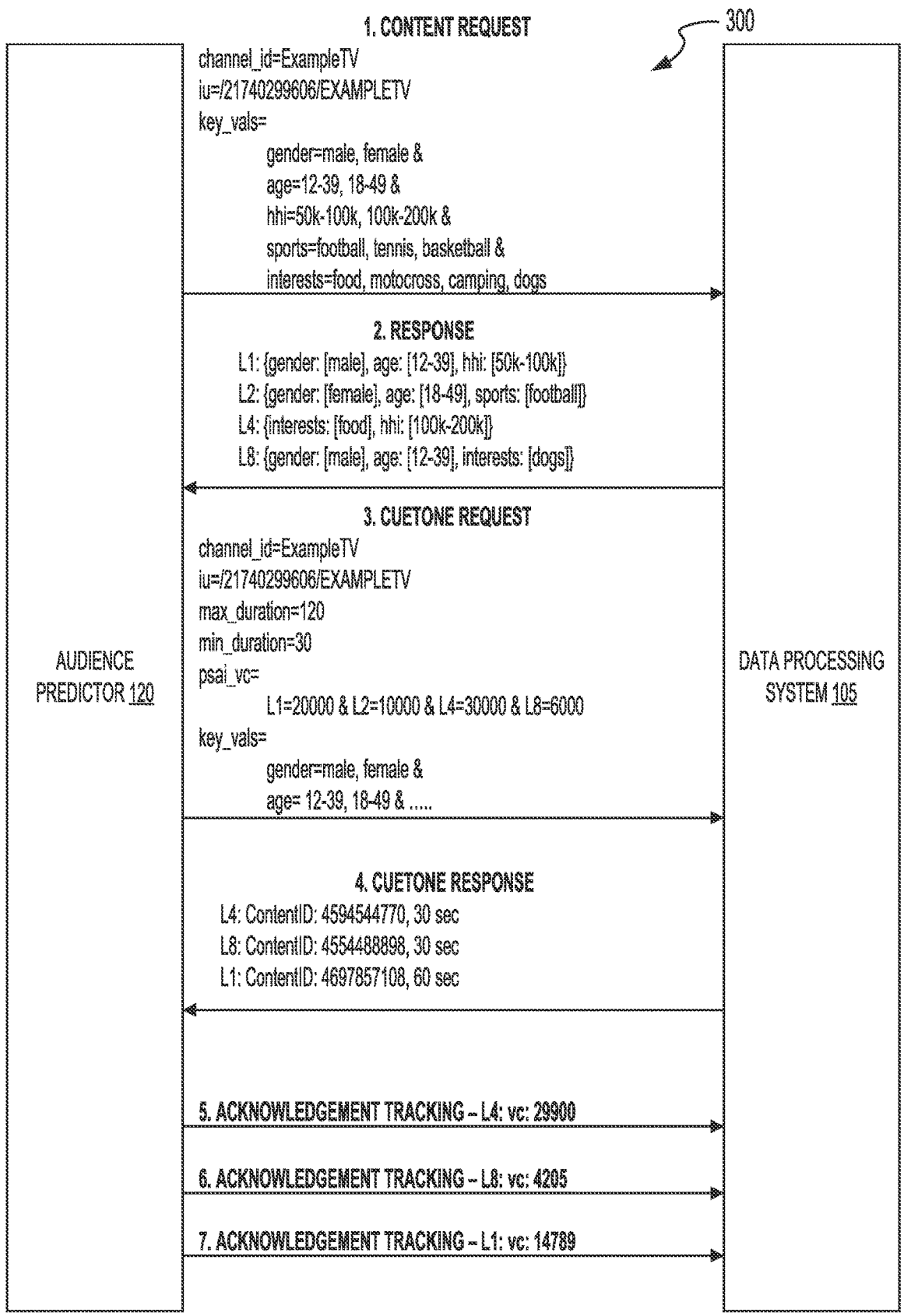
FIG. 3 shows an illustrative system flow diagram of various requests and transmissions through at least some devices of the systems described herein.

Referring now to FIG. 3, depicted is an example high-level system flow diagram 300 illustrating various example communications between at least some devices of the systems described herein. As illustrated in system flow 300, the audience predictor 120 can communicate several requests and acknowledgements to the data processing system 105, which communicates various content selection responses. Starting from the top, the audience predictor can provide the data processing system 105 with a content request. The request can reflect a first time period, such as a time period to insert content to a broadcast stream, or be associated with a timestamp value that reflects a time of day, year, and can include date information. The request can identify a content broadcaster (e.g., a content broadcaster 125, etc.). The identification of a content broadcaster can include an identifier code or value that is associated with the content broadcaster. In some implementations, the identification can include a uniform resource identifier that includes a path to one or more resources, configuration settings, or identifiers associated with the respective content broadcaster. The request can further include information about a broadcast stream, and other criteria to select content to broadcast. Although the criteria depicted here are gender, age, type of sports, and various interest categories, it should be understood that any number or type of criteria can be used to indicate audience or broadcast receiver device characteristics.

In the second step, the data processing system can provide a response that includes one or more content category groups, or line items. Although the content category groups are depicted here as being in a JSON format, it should be understood that the content category groups can be in any computer readable format. As depicted, each of the content category groups includes categories that correspond to those included in the request. For example, the first content category group is associated with males who are age 12-39, the second category group is associated with females who are age 18-49 and are interested in football, and so on. Although it is illustrated here that there are only four content category groups in the response, it should be understood that any number of content category groups can be provided by the data processing system.

In the third step, the audience predictor 120 can provide the data processing system with a cute tone request. The cue tone request can include information about the audience characteristics associated with each of the category groups returned by the data processing system in the second step. For example, the audience predictor can provide a predictor number of broadcast receivers that are associated with each content category group that access the respective broadcast. Here, the first content category group (e.g., L1) is predicted to be associated with 20000 broadcast receivers, the second category group (e.g., L2) is predicted to be with 10000 broadcast receivers, and so on. These values are purely exemplary, and should not be construed as limiting the scope of any implementations described herein. The cue tone request can further include information about the content slot in which the content items will be inserted, such as the minimum and maximum duration of each content item. Here, the minimum duration of the content items is indicated as 30 seconds, and the maximum duration is indicated as 120 seconds.

In the fourth step, in response to the cue tone request, the data processing system 105 can provide a cue tone response. The data processing system 105 can select content items that correspond to the audience characteristics, as described herein, and can provide content identifiers in a cue tone response. The cue tone response can be an ordered list of content identifiers, such as URIs, or key values to a content database (e.g., the asset storage 115, etc.) The cue tone response can further include additional metadata such as the content duration, and the content group to which each content item corresponds. The audience predictor 120 can forward the content identifiers to the content broadcaster (e.g., the content broadcaster 125) for retrieval.

In steps five, six, and seven, the audience predictor 120 can provide three separate acknowledgement messages to the data processing system 105. The acknowledgement messages can indicate the number of broadcast receiver devices that correspond to the content category groups that actually accessed the content provided by the data processing system. The actual number of broadcast receiver nodes that both correspond to the respective category groups of the content items and presented the content item in the broadcast stream can be different than the predicted number provided by the audience predictor 120, as indicated. Here, the predicted number of presentations by related broadcast receivers for L4 was 30000, but the actual number is slightly less, at 29900 actual accesses. Further, the predicted number for L8 was 6000, but the actual number was 4205. Finally, L1 was predicted at 20000 accesses, but instead received only 14789. Although it is indicated as though the actual accesses are less than the predicted accesses, it should be understood that the actual number of accesses by related (e.g., associated with users that are associated with the category group) broadcast receivers can be more than, less than, or the same as the predicted number of accesses.

Figure 4:
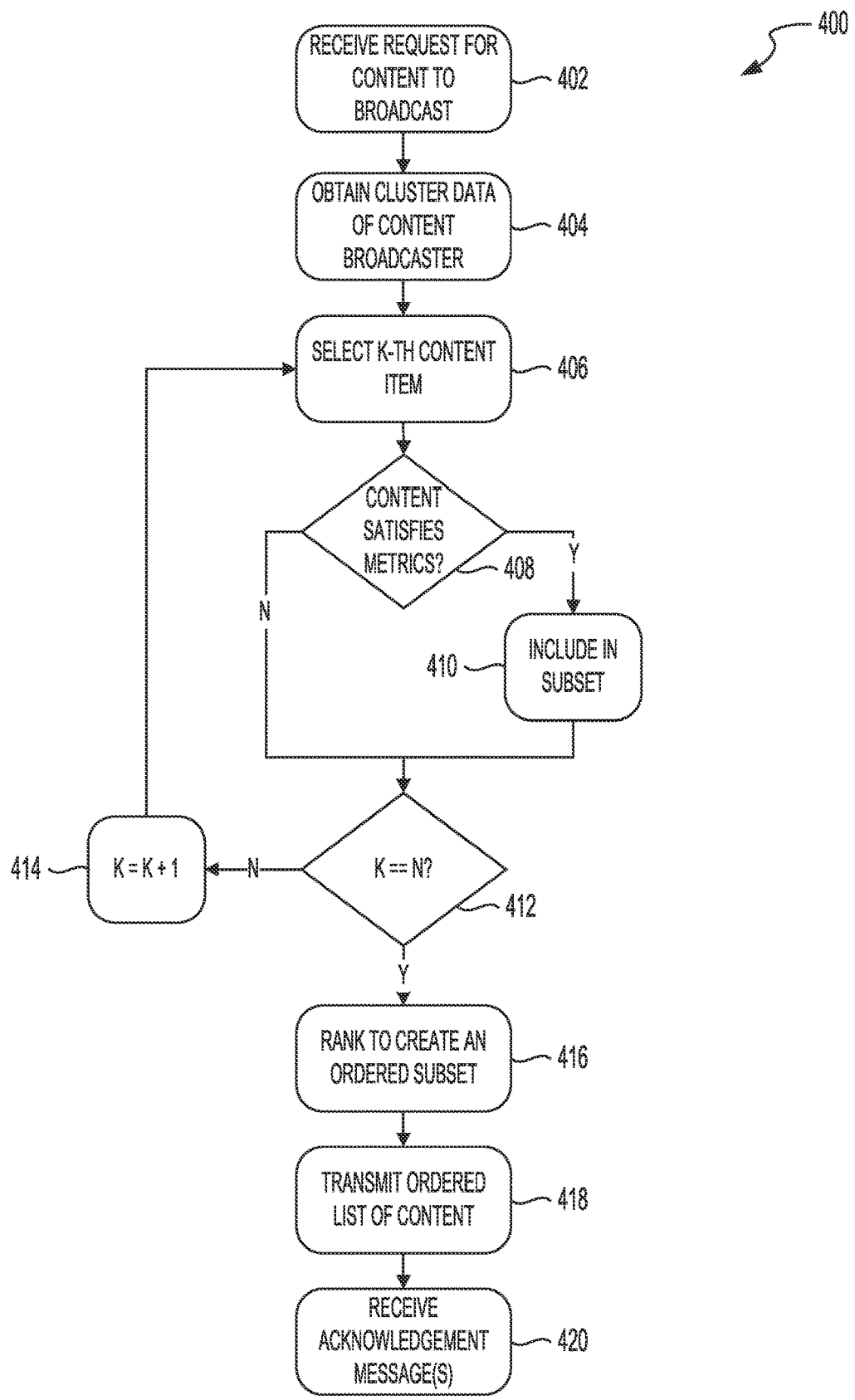
FIG. 4 shows a flow diagram of a method of reducing acknowledgement requests in broadcast networks.

Referring now to FIG. 4, depicted is an illustrative flow diagram of an example method 400 of reducing acknowledgement requests in broadcast networks. The method can be performed, for example, by the data processing system 105 described herein in conjunction with FIG. 1, or the computer system 500 described herein in conjunction with FIG. 5. The data processing system (e.g., the data processing system 105, etc.) can receive a request for content to broadcast (ACT 402). The data processing system can obtain cluster data of a content broadcaster (ACT 404). The data processing system can select the k-th content item (ACT 406). The data processing system can determine whether the content item satisfies the selection metrics (ACT 408). The data processing system can include the content item in the subset (ACT 410). The data processing system can determine whether the counter register k is equal to the number of content items n (ACT 412). The data processing system can increment the counter register k (ACT 414). The data processing system can rank the subset to create an ordered subset (ACT 416). The data processing system can transmit an ordered list of content items (ACT 418). The data processing system can receive one or more acknowledgement messages (ACT 420).

The data processing system (e.g., the data processing system 105, etc.) can receive a request for content to broadcast (ACT 402). The request can reflect a first time period, or be associated with a timestamp value that reflects a time of day, year, and can include date information. The request can identify a content broadcaster, which may also be referred to as a content publisher (e.g., an audience predictor 120 or content broadcaster 125, etc.). The identification of a content broadcaster can include an identifier code or value that is associated with the respective content broadcaster. In some implementations, the identification can include a uniform resource identifier that includes a path to one or more resources, configuration settings, or identifiers associated with the respective content broadcaster. The request can further include information about a broadcast stream, and other broadcaster receiver criteria to usable to select content to broadcast. For example, the request can include an identifier of a broadcast channel associated with the content broadcaster. The request can include one or more key values that correspond to cluster selection metrics (e.g., the broadcast receiver characteristics, etc.). The cluster selection metrics can include information about the audience of a content broadcaster, for example, information about the users of broadcast receiver devices (e.g. broadcast receivers 220, etc.) that access the content broadcast provided by the content broadcaster. This information can include, for example, total viewership information, category identifiers (e.g., categories that correspond to various potential interests or topics, etc.), potential user interests, demographic information (e.g., age, gender, etc.), and other information about the characteristics of the audience of the content broadcaster.

The data processing system can obtain cluster data of a content broadcaster (ACT 404). To identify content items to include in the broadcast stream of the content publisher (e.g. the content broadcaster 125, etc.) that are relevant to the audience of the content publisher, the data processing system can obtain audience data (e.g., cluster data, receiver device information, etc.). In some implementations, the data processing system access one or more database entries in computer memory to identify cluster data, or specific data about audience characteristics of the content publisher during a specified time period. The data processing system can identify category groups that are associated with each of the content items in the asset storage (e.g., asset storage 115, etc.), and access the database entries of content publisher audience information based on the content groups. The content groups can include at least one category identifier identified in request for content to broadcast received by the request receiver 130. In some implementations, the data processing system can update the cluster data based on information received from the audience predictor (e.g., the audience predictor 120, etc.) For example, the audience predictor can periodically provide updated cluster data (e.g., candidate cluster information, etc.) to the data processing system. The data processing system can receive the updated cluster data, and update and store the cluster data in one or more data structures in computer memory.

In some implementations, the data processing system can transmit one or more requests to the audience predictor or the content broadcaster (e.g., the content broadcaster 125, etc.) to obtain the cluster data. The request can include one or more proposed content selection metrics or categories. The content selection metrics or categories can be identified by the data processing system by identifying one or more content items that correspond to the key values in the request for content to broadcast. For example, the request for content to broadcast can include identifiers of categories or demographics that are relevant to the respective content publisher. The data processing system can access a database (e.g., the asset storage 115), to identify one or more content items that are associated with at least one of those category identifiers. In order to determine which content items to recommend for broadcast, the data processing system can transmit one or more requests for audience information associated with each category identifier associated with the one or more content items. Each of the content groups can be organized in a computer-readable format, for example, a JSON format. The request can be a list of category groups that each include one or more category or demographic identifier. These category groups may also be referred to as line items. Each category group can correspond to at least one content item in the asset storage.

After providing the request for audience data to the audience predictor or the content broadcaster, the data processing system can receive one or more messages from the audience predictor or the content broadcaster. The messages can include audience information that corresponds to each of the content groups provided in the respective request. For example, if the request included a content group (e.g., a line item, etc.) can include the following categories: female, age 18-49, and an interest in football. The corresponding response message from the audience predictor or the content broadcaster can include information about audience of the content publisher at the particular time that corresponds to each of those categories. This information can be a forecast, or estimate, of viewership or access to the broadcast stream at the time indicated by the request. In some implementations, the cluster data (e.g., audience information) can reflect the real-time viewership or access to the broadcast stream of the audience at the time of the request. Each category group included in the request for the cluster data can be associated with different viewership or access numbers. Accordingly, the response message received from the audience predictor or the content broadcaster can include the viewership information for each content category group in the request. The response message can further include details about the broadcast slot in which the selected content will be inserted. This information can include a start time stamp, a stop timestamp, minimum content duration values, maximum content duration values, and a total slot duration value, among others. The response message can also identify additional information about the content broadcaster, for example additional channel metadata. The metadata can include information about what is being broadcast by the content publisher, including broadcast content, content schedules (e.g., when particular content is broadcast, etc.), the broadcast medium (e.g., internet livestream, television broadcast, cable television broadcast, radio broadcast, etc.), and other information about the content broadcaster 125.

The data processing system can select the k-th content item (ACT 406). In order to select the content items to include in the subset, the data processing system can iterate over each of the content items maintained in the asset storage. The data processing system can iteratively loop through each of the content items based on a counter register k. Each of the content items in the asset storage can be indexed in a data structure by an index value (e.g., index 0, index 1, index 2, etc.). To process content item, the data processing system can select the content item that includes or is associated with the index value which is equal to, or approximately equal to, the counter register k. If it is the first iteration of the loop, the counter register k can be initialized to an initialization value (e.g., k=0, k=1, etc.) before selecting the k-th content item in the asset storage. Selecting the content item can include copying the data associated with the content item, such as metadata or content selection metrics, to a different region of computer memory in the data processing system, for example a working region of memory.

The data processing system can determine whether the content item satisfies the selection metrics (ACT 408). The selected content item can include category identifiers, keywords, metadata, or other information related to audience characteristics as described herein. Accordingly, the content item can be associated with cluster filtering criteria that are associated with particular audience characteristics, and some content items can be more closely associated with those characteristics than other content items. For example, each of the data processing system can determine a weight value for the selected content item that indicates a level of relatedness of the content filtering characteristics of the content item to the respective predicted audience characteristics. To identify whether the data processing system should include the selected content item in the subset, the data processing system can compare the weight value to a subset threshold value. If the weight value is greater than or equal to the subset threshold value, the data processing system can perform ACT 410. If the weight value is not greater than or equal to the subset threshold value, the data processing system can perform ACT 412.

The data processing system can include the content item in the subset (ACT 410). Including the content item in the subset can include copying one or more content item identifiers to a data structure in the memory of the data processing system. If the subset data structure is not yet generated (e.g., the first iteration of the loop, etc.), the data processing system can allocate a region of memory in the data processing system to contain the subset of content items. In some implementations, the subset of content items is a list of content item identifiers and associated metadata. The data processing system can copy the associated metadata from the asset storage to the data structure containing the subset of content items. The metadata can include information about content length, and information about one or more content groups, or line items, associated with the content item.

The data processing system can determine whether the counter register k is equal to the number of content items n (ACT 412). To determine whether the data processing system has iterated through each content item, the data processing system can compare the counter register used to select each content item to the total number of content items in the asset storage n. If the counter register k is not equal to (e.g., less than) the total number of content items n, the data processing system can execute ACT 414. If the counter register k is equal to (e.g., equal to or greater than) the total number of content items n, the data processing system can execute ACT 416.

The data processing system can increment the counter register k (ACT 414). In some implementations, the data processing system can add one to the register k to indicate the next unselected content item in the asset storage, in some implementations, the data processing system can set the counter register k to a memory address value (e.g., location in computer memory) of the next unselected content item. In some implementations, the memory address value of the next unselected content item can be included in the data structure at the location of the current (e.g., selected) content item. After incrementing the value of the counter register k, the data processing system can execute ACT 406.

The data processing system can rank the subset to create an ordered subset (ACT 416). To rank each of the subset of content items, the data processing system can compare various characteristics of the content items to characteristics of the broadcast stream, audience data, and the characteristics of the other content items of the subset, among others as described herein. The ranked order of the subset of the content items can be determined based on the viewership of the category group associated with the content items. Ranking the content items can further be based on duration of the content items. For example, content items that associated with a larger duration value can be placed near the bottom of the order, and content items that are associated with a shorter duration value can be placed at the top of the order, or vice-versa. In some implementations, the data processing system can further rank the content items based on additional values, for example, conversion likelihood values, engagement values, and other metrics associated with the presentation or impact of a content item.

The data processing system can transmit an ordered list of content items (ACT 418). The data processing system can transmit the ordered list of content items to the audience predictor or the content broadcaster. The list of content items can include a list of identifiers of the ordered subset content items, for example a list of uniform resource identifiers that point to the respective content item in the asset storage. In some implementations, the data processing system can access the asset storage and retrieve the content items identified in the list of content items. Then, in lieu of transmitting the list of content identifiers, the data processing system can transmit, provide, or otherwise communicate the content items themselves to at least one of the audience predictor or the content broadcaster. If received by the audience predictor, the audience predictor can forward the content items to the content broadcaster for insertion in the corresponding content broadcast. If the content broadcaster receives content items, it need not retrieve the content items from the asset storage, and can encode and insert, or simply insert, the content as per the markers indicated in the broadcast stream, as described herein.

The data processing system can receive one or more acknowledgement messages (ACT 420). The data processing system can receive acknowledgement data messages associated with each of the ordered content items from the audience predictor or the content broadcaster. The acknowledgement messages can acknowledge access, viewership, or presentation of a content item provided by the data processing system after it has been broadcast by the content broadcaster. To gather the viewership, access, or presentation data of the broadcast stream, the content broadcaster or the audience predictor can maintain a record of number of presentations of the content stream by broadcast receivers. The data processing system can compare the actual viewership or access data of the broadcast stream with the predicted audience data received from the audience predictor to determine feedback data to send to the audience predictor. The data processing system can store, in one or more data structures, the total actual viewership information, the order of the subset of content items provided to the audience predictor or the content broadcaster, and content item metadata in association with the content publisher in the memory accessible by the data processing system.

Referring now to FIG. 5, depicted is the general architecture of an illustrative computer system 500 that may be employed to implement any of the computer systems discussed herein in accordance with some implementations. The computer system 500 can be used to provide information via the network 210 for display. The computer system 500 of FIG. 5 comprises one or more processors 520 communicatively coupled to memory 525, one or more communications interfaces 505, and one or more output devices 510 (e.g., one or more display units) and one or more input devices 515. The processors 520 can be included in the data processing system 105 or any other computing device described herein.

In the computer system 500 of FIG. 5, the memory 525 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the computer system 500 of FIG. 5, the data processing system 105 can include the memory 525 to store information related to the sets of user identifiers, the generated vectors, among others. The processor(s) 520 shown in FIG. 5 may be used to execute instructions stored in the memory 525 and, in so doing, also may read from or write to the memory various information processed and or generated pursuant to execution of the instructions.

The processor 520 of the computer system 500 shown in FIG. 5 also may be communicatively coupled to or control the communications interface(s) 505 to transmit or receive various information pursuant to execution of instructions. For example, the communications interface(s) 505 may be coupled to a wired or wireless network, bus, or other communication means and may therefore allow the computer system 500 to transmit information to or receive information from other devices (e.g., other computer systems). While not shown explicitly in the system of FIG. 5, one or more communications interfaces facilitate information flow between the components of the computer system 500. In some implementations, the communications interface(s) may be configured (e.g., via various hardware components or software components) to provide a website as an access portal to at least some aspects of the computer system 500. Examples of communications interfaces 505 include user interfaces (e.g., web pages), through which the user can communicate with the computer system 500.

The output devices 510 of the computer system 500 shown in FIG. 5 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device", "client device", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method, comprising:
   receiving, by a data processing system, at a first time, a single request for content to broadcast to a cluster of a content publisher comprising a plurality of client devices, the single request identifying the content publisher;
   obtaining, by the data processing system, from an audience predictor, cluster data of the content publisher corresponding to the first time, the cluster data identifying content selection metrics based on predicted characteristics of the cluster of the content publisher corresponding to the first time, and usable to select the content to broadcast;
   determining, by the data processing system, from a plurality of content items, a subset of content items, each content item of the subset of content items having cluster filtering criteria that satisfy the content selection metrics;
   ranking, by the data processing system, based on the content selection metrics and the cluster filtering criteria of each content item of the subset of content items, the subset of content items to create an order of the content items included in the subset of content items;
   transmitting, by the data processing system, to the content publisher, data identifying the order of the content items, the content publisher using the order to broadcast each content item included in the subset of content items;
   obtaining, by the data processing system, an acknowledgement message indicating a number of client devices of the plurality of client devices that correspond to a subgroup of the cluster that accessed the content transmitted by the data processing system;
   comparing the number of client devices corresponding to the subgroup of the cluster to a total number of client devices in the cluster; and
   transmitting, by the data processing system, feedback data comprising the comparison to the audience predictor.

2. The method of claim 1, wherein receiving a request for content further comprises:
   receiving, by the data processing system, candidate cluster information; and updating, by the data processing system, the cluster data using the candidate cluster information.

3. The method of claim 1 wherein determining the subset of content items further comprises:
   receiving, by the data processing system, content information from the content publisher;
   accessing, by the data processing system, each content item of the plurality of content items to determine the respective cluster filtering criteria;
   comparing, by the data processing system, each of the respective cluster filtering criteria to the cluster data to determine that the cluster filtering criteria satisfies the content selection metrics; and
   selecting, by the data processing system, the respective content item to be included in the subset of content items responsive to the determination that the cluster filtering criteria satisfies the content selection metrics.

4. The method of claim 3, wherein each of the plurality of content items is associated with a respective duration value, and determining the subset of content items further comprises:
   comparing, by the data processing system, the respective duration value associated with each of the plurality of content items to a duration threshold to create a filtered set of content items; and
   determining, by the data processing system, from the filtered set of content items, the subset of content items, each content item of the subset of content items having cluster filtering criteria that satisfies the content selection metrics.

5. The method of claim 1 wherein ranking the subset of content items is further based on at least one of a respective content item expiration value, a respective content item duration value, or a respective content item access count value.

6. The method of claim 1, wherein transmitting, to the content publisher, the data identifying the order of the content items further comprises transmitting, by the data processing system, the subset of content items to be broadcast by the content publisher in a broadcast stream.

7. The method of claim 1, wherein obtaining the cluster data of the content publisher further comprises accessing, by the data processing system, from a database, a data record associated with the publisher to obtain the cluster data of the content publisher.

8. The method of claim 1, further comprising:
receiving, by the data processing system, from the content publisher, an acknowledgement request including characteristics of the cluster of the content publisher;
updating, by the data processing system, a data structure associated with the content publisher and the subset of content items based on the characteristics of the cluster of the content publisher included in the acknowledgement request.

9. A system, comprising:
one or more processors coupled to a memory, the one or more processors configured to:
receive, at a first time, a single request for content to broadcast to a cluster of a content publisher comprising a plurality of client devices, the single request identifying the content publisher;
obtain, from an audience predictor, cluster data of the content publisher corresponding to the first time, the cluster data identifying content selection metrics based on predicted characteristics of the cluster of the content publisher corresponding to the first time, and usable to select the content to broadcast;
determine, from a plurality of content items, a subset of content items, each content item of the subset of content items having cluster filtering criteria that satisfy the content selection metrics;
rank, based on the content selection metrics and the cluster filtering criteria of each content item of the subset of content items, the subset of content items to create an order of the content items included in the subset of content items;
transmit, to the content publisher, data identifying the order of the content items, the content publisher using the order to broadcast each content item included in the subset of content items;
obtain an acknowledgement message indicating a number of client devices of the plurality of client devices that correspond to a subgroup of the cluster that accessed the content transmitted by the system;
compare the number of client devices corresponding to the subgroup of the cluster to a total number of client devices in the cluster; and
transmit feedback data comprising the comparison to the audience predictor.

10. The system of claim 9, wherein the one or more processors are further configured to: receive candidate cluster information; and
update the cluster data using the candidate cluster information.

11. The system of claim 9 wherein the one or more processors are further configured to:
receive content information from the content publisher;
access each content item of the plurality of content items to determine the respective cluster filtering criteria;
compare each of the respective cluster filtering criteria to the cluster data to determine that the cluster filtering criteria satisfies the content selection metrics; and
select the respective content item to be included in the subset of content items responsive to the determination that the cluster filtering criteria satisfies the content selection metrics.

12. The system of claim 11, wherein each of the plurality of content items are associated with a respective duration value, and in determining the subset of content items, the one or more processors are further configured to:
compare the respective duration value associated with each of the plurality of content items to a duration threshold to create a filtered set of content items; and
determine, from the filtered set of content items, the subset of content items, each content item of the subset of content items having cluster filtering criteria that satisfies the content selection metrics.

13. The system of claim 9, wherein in ranking the subset of content items, the one or more processors are further to rank the subset of content items based on at least one of a respective content item expiration value, a respective content item duration value, or a respective content item access count value.

14. The system of claim 9, wherein in transmitting, to the content publisher, the data identifying the order of the content items, the one or more processors are further configured to transmit the subset of content items to be broadcast by the content publisher in a broadcast stream.

15. The system of claim 9, wherein in obtaining the cluster data of the content publisher, the one or more processors are further configured to access, from a database, a data record associated with the publisher to obtain cluster data of the content publisher.

16. The system of claim 9, wherein the one or more processors are further configured to:
receive, from the content publisher, an acknowledgement request including characteristics of the cluster of the content publisher;
update a data structure associated with the content publisher and the subset of content items based on the characteristics of the cluster of the content publisher included in the acknowledgement request.

17. A non-transitory computer readable medium encoded with instructions that when executed by one or more processors, cause the one or more processors to:
receive, at a first time, a single request for content to broadcast to a cluster of a content publisher comprising a plurality of client devices, the single request identifying the content publisher;
obtain, from an audience predictor, cluster data of the content publisher corresponding to the first time, the cluster data identifying content selection metrics based on predicted characteristics of the cluster of the content publisher corresponding to the first time, and usable to select the content to broadcast;
determine, from a plurality of content items, a subset of content items, each content item of the subset of content items having cluster filtering criteria that satisfy the content selection metrics;
rank, based on the content selection metrics and the cluster filtering criteria of each content item of the subset of content items, the subset of content items to create an order of the content items included in the subset of content items;
transmit, to the content publisher, data identifying the order of the content items, the content publisher using the order to broadcast each content item included in the subset of content items;
obtain an acknowledgement message indicating a number of client devices of the plurality of client devices that correspond to a subgroup of the cluster that accessed the content transmitted by a system;
compare the number of client devices corresponding to the subgroup of the cluster to a total number of client devices in the cluster; and
transmit, by the system, feedback data comprising the comparison to the audience predictor.

18. The non-transitory computer readable medium of claim 17, wherein the instructions are further configured to cause the one or more processors to:
receive candidate cluster information; and
update the cluster data using the candidate cluster information.

19. The non-transitory computer readable medium of claim 18, wherein each of the plurality of content items is associated with a respective duration value, and the instructions are further configured to cause the one or more processors to:
compare the respective duration value associated with each of the plurality of content items to a duration threshold to create a filtered set of content items; and
determine, from the filtered set of content items, the subset of content items, each content item of the subset of content items having cluster filtering criteria that satisfies the content selection metrics.

20. The non-transitory computer readable medium of claim 17, wherein the instructions are further configured to cause the one or more processors to:
receive content information from the content publisher;
access each content item of the plurality of content items to determine the respective cluster filtering criteria;
compare each of the respective cluster filtering criteria to the cluster data to determine that the cluster filtering criteria satisfies the content selection metrics; and
select the respective content item to be included in the subset of content items responsive to the determination that the cluster filtering criteria satisfies the content selection metrics.

21. The non-transitory computer readable medium of claim 17, wherein the instructions are further configured to cause the one or more processors to rank the subset of content items further based on at least one of a respective content item expiration value, a respective content item duration value, or a respective content item access count value.

22. The non-transitory computer readable medium of claim 17, wherein the instructions are further configured to cause the one or more processors to transmit, to the content publisher, the subset of content items to be broadcast by the content publisher in a broadcast stream.

23. The non-transitory computer readable medium of claim 17, wherein the instructions are further configured to cause the one or more processors to access, from a database, a data record associated with the publisher to obtain the cluster data of the content publisher.

24. The non-transitory computer readable medium claim 17, wherein the instructions are further configured to cause the one or more processors to:
receive, from the content publisher, an acknowledgement request including characteristics of the cluster of the content publisher;
update a data structure associated with the content publisher and the subset of content items based on the characteristics of the cluster of the content publisher included in the acknowledgement request.

* * * * *